United States Patent [19]

O'Donnelly

[11] Patent Number: 5,284,706
[45] Date of Patent: Feb. 8, 1994

[54] SEALING GLASS COMPOSITE

[75] Inventor: Brien E. O'Donnelly, Branford, Conn.

[73] Assignee: Olin Corporation, New Haven, Conn.

[21] Appl. No.: 812,300

[22] Filed: Dec. 23, 1991

[51] Int. Cl.$^5$ ............................................... B32B 5/16
[52] U.S. Cl. .................................. 428/330; 428/323; 428/329; 428/331; 428/426; 501/15; 501/17; 501/32
[58] Field of Search ............... 428/331, 330, 329, 323, 428/426; 501/32, 15, 17

[56] References Cited

U.S. PATENT DOCUMENTS

| | | | |
|---|---|---|---|
| 3,954,486 | 5/1976 | Francel et al. | 106/53 |
| 3,963,555 | 6/1976 | Dumesnil et al. | 106/47 R |
| 4,006,028 | 2/1977 | Nofziger | 106/47 R |
| 4,185,139 | 1/1980 | Smernos | 428/404 |
| 4,410,927 | 10/1983 | Butt | 361/386 |
| 4,532,222 | 7/1985 | Butt | 428/327 |
| 4,752,521 | 6/1988 | Smith, III | 428/209 |
| 4,775,647 | 10/1988 | Smith, III | 501/15 |
| 4,796,083 | 1/1989 | Cherukuri et al. | 357/74 |
| 4,801,488 | 1/1989 | Smith, III | 428/209 |
| 4,818,730 | 4/1989 | Smith, III et al. | 501/15 |
| 4,889,960 | 12/1989 | Butt | 428/333 |
| 4,908,339 | 3/1990 | Blount | 501/32 |
| 4,919,991 | 4/1990 | Gadkaree | 501/32 |
| 4,952,531 | 8/1990 | Cherukuri | 501/69 |
| 5,023,398 | 6/1991 | Mahulikar | 174/52.4 |
| 5,047,371 | 9/1991 | Cherukuri | 501/21 |
| 5,108,958 | 4/1992 | Moh et al. | 501/32 |

OTHER PUBLICATIONS

Sunahara et al. entitled "Newly Developed Hard Glass Package" appearing in Reports of the Research Lab, Asahi Glass Co. Ltd., 41 (2) (1991) at pp. 267-282.
Takamore, entitled "Solder Glasses" published by Academic Press, Inc. Copyright 1979 at pp. 173-255.

*Primary Examiner*—Paul J. Thibodeau
*Assistant Examiner*—D. S. Nakarani
*Attorney, Agent, or Firm*—Gregory S. Rosenblatt

[57] ABSTRACT

There is provided a sealing glass composite which has a desired coefficient of thermal expansion. The composite is made up of a glass matrix having a first coefficient of thermal expansion and a substantially spherical particulate additive with a second coefficient of thermal expansion dispersed within the matrix. Use of a substantially spherical particulate additive having a reduced surface area as compared to other shaped particulate additive minimizes the reaction between the additive and the glass matrix. The spherical particles also provide better flow at high loading factors and improved fracture toughness.

10 Claims, No Drawings

SEALING GLASS COMPOSITE

CROSS REFERENCED TO RELATED APPLICATIONS

This application relates to U.S. Pat. Nos. 4,752,521; 4,775,647; 4,801,488; and 4,818,730 all by Smith III or Smith III et al. and all incorporated by reference in their entireties herein.

FIELD OF THE INVENTION

The invention relates to composite sealing glasses. More particularly, a substantially spherical particulate additive is mixed with a glass matrix to produce a composite having a desired coefficient of thermal expansion.

BACKGROUND OF THE INVENTION

During the fabrication of electronic devices, integrated circuit devices are encapsulated in a protective package for ease of handling and protection from environmental or mechanical damage. The highest degree of protection is provided by a hermetic package design. Hermetic packages are usually glass sealed to achieve both environmental isolation and electrically isolated leads.

In a conventional ceramic dual-in-line package, a low temperature sealing glass is used to seal a metal (typically Alloy 42 or Kovar) leadframe between ceramic components. The hermetically sealed package encases an integrated circuit device which is attached to one of the components and electrically connected to the leadframe.

Hermetic glass sealed metal package are disclosed in U.S. Pat. No. 4,410,927 by Butt with copper or copper alloy components and in U.S. Pat. No. 5,023,398 to Mahulikar with aluminum alloy components.

The packages are heated and cooled several times during assembly and operation. For a reliable package, the sealing glass must have a coefficient of thermal expansion (CTE) close to that of the package components. Generally, the variation in CTE should not be in excess of 10%. Absent this match, thermally induced stresses are applied to the glass to metal or glass to ceramic seals and fracture is likely.

Low temperature solder glasses are used for package fabrication. The sealing temperature should be below about 450° C. to prevent thermal degradation of the integrated circuit device during glass sealing. Suitable glasses are based on a lead borate, lead zinc borate, lead borosilicate or lead-zinc borosilicate matrix. Additions are made to the glass matrix to provide the desired sealing characteristics, corrosion resistance, electrical resistivity, dielectric constant, etc. These glasses generally have a (CTE) of from 80 to $130 \times 10^{-7}$ in/in/° C.

This CTE range is generally unacceptable for sealing either ceramic packages or metal packages. Ceramic packages, typically alumina $Al_2O_3$ based, have a CTE of about $65 \times 10^{-7}$ in/in/° C. Copper and copper alloys have a CTE of about $170 \times 10^{-7}$ in/in/° C., while aluminum and aluminum alloys have a CTE of about $270 \times 10^{-7}$ in/in/° C.

To overcome the CTE mismatch, a filler may be added to the glass. The filler is selected to have a coefficient of thermal expansion different than the glass matrix and the resulting composite has an intermediate coefficient of thermal expansion. The coefficient of thermal expansion of the composite is closely related to the volume fraction of filler and glass matrix in the sealing glass composite.

Fillers to lower the CTE of a glass are disclosed in U.S. Pat. No. 3,954,486 to Francel et al and include silica, zirconia, quartz and beta-eucryptite. U.S. Pat. No. 3,963,505 to Dumesnil et al discloses the use of zinc oxide while U.S. Pat. No. 4,006,028 to Nofziger discloses a mixture of a coarse and fine refractorys such as zirconium silicate $(ZrSiO_4)$.

Fillers to raise the coefficient of thermal expansion include calcium fluoride and barium fluoride as disclosed in the above noted patents to Smith III. Silicon dioxide coated calcium fluoride as a filler is disclosed in U.S. Pat. No. 4,185,139 to Smernos.

A suitable filler has limited solubility in the glass matrix. Only the undissolved volume fraction of the filler influences the CTE of the composite. Coating the calcium fluoride particles with silicon dioxide, while effective is both costly and time consuming. A preferred alternative is uncoated particles.

The CTE of the electronic package components may be vastly different than that of the glass matrix. Large quantities of filler, in excess of 30–50 volume percent, may be required for the composite to achieve an acceptable CTE. The particle morphology of conventional fillers is randomly shaped and frequently angular so that particle distribution obtained by sieving is large. When the particles are in close proximity within the glass, they interlock deteriorating the flow characteristics of the glass.

SUMMARY OF THE INVENTION

Accordingly, it is an object of the invention to provide a glass composite which does not have the limitations of the prior art. It is a feature of the invention that the composite is formed by adding a filler or fillers to a glass matrix. This filler is an essentially spherical particle.

The advantages of the filler of the invention include reduced surface area resulting in less dissolution in the glass matrix. The spherical filler is not angular and has less propensity for mechanical interlocking thereby improving the flow properties of the glass. Further, the spherical filler increases glass fracture toughness by minimizing the stress concentration at the glass-filler interface reducing stress induced fracture initiation points. The spherical particles facilitate a more narrow particle distribution from sieving. The improved flow of the spherical filler leads to a higher loading density and the sealing glass composites can be tailored to having a greater range of coefficients of thermal expansion.

In accordance with the invention, there is provided a glass composite. The glass composite has a sealing glass matrix and at least one substantially spherical particulate additive dispersed within the matrix.

The above stated objects, features and advantages, as we as others, will become more apparent from the specification which follows.

DETAILED DESCRIPTION OF THE PREFERRED EMBODIMENTS

The composite sealing glasses of this invention include a glass matrix and at least one substantially spherical particulate additive which is dispersed within that glass matrix. Any suitable low melting sealing glass may be utilized. The preferred glasses are lead borate, lead-zinc borate, lead borosilicate and lead-zinc borosilicate. Most preferably, the glass is lead borate containing one or more other glass components such as bismuth, zinc, aluminum, silicon, barium, arsenic, tin and tellurium present in the respective oxide form. The solder glass has a CTE between about 80 and $130 \times 10^{-7}$ in/in/°C. over the temperature range from ambient to the glass transition temperature (typically about 300° C. for a lead borate-type glass).

The weight percent compositional ranges for the most preferred glass matrices are set forth in Table I wherein the total content of all oxides is 100%.

TABLE 1

| Oxide | Broad Range (Weight %) | Preferred Range (Weight %) |
|---|---|---|
| PbO | 70-85 | 75-85 |
| ZnO | 0-20 | 0.5-16 |
| $B_2O_3$ | 5-15 | 8-15 |
| $SiO_2$ | 0-10 | 0-5 |
| BaO | 0-3 | 0-2 |
| $SnO_2$ | 0-5 | 0-2 |

Other conventional glass-making oxides such as CaO, $Bi_2O_3$, $Na_2O$, $K_2O$, $Li_2O$, CdO and $Fe_2O_3$ can be included.

In accordance with a first embodiment of the invention, a particulate filler having a coefficient of thermal expansion higher than the glass matrix is added to the matrix. Any additive having limited reactivity in the glass may be used. The preferred fillers are calcium fluoride and barium fluoride.

The filler is substantially spherical and comprises particles having an effective diameter of, preferably, from about 1 to about 100 microns. More preferably, the filler diameter is from about 5 to about 40 microns. Spherical particles may be readily sieved to precise tolerances. It is preferred that all filler diameters be within about 10 percent of a mean particle size. In a bimodal distribution, there could be two medium values around which particle size is based.

The effective filler size limitations result because smaller particles more readily dissolve in the glass during the sealing process and the composite then loses the benefit of the high CTE additive. Conversely, if the particles are too large, glass flow is restrained resulting in a loss of strength due to the formation of voids. The minimum effective filler size is that which dissolves less than about 10% by weight in the glass matrix during glass sealing while the maximum effective filler size is that which does not significantly affect glass flow.

Smaller particles may be used when the filler is spherical. The reduced surface area of a sphere relative to any other geometry reduces the surface area available for dissolution. Larger spherical particles lack angular features and resist interlocking. Additionally, the spherical particles may be readily sized to precise tolerances. Interlocking as the result of the commingling of different size particles is less of a factor.

The filler is added in a volume fraction effective to produce a glass composite having a desired coefficient of thermal expansion. The desired coefficient of thermal expansion will generally be within about 5% of the coefficient of thermal expansion of the substrates to be joined by the sealing glass.

With spherical particles, the filler may be loaded to in excess of about 85 weight percent (72 volume percent) of the glass matrix and still avoid significant interlocking. Preferably, the filler occupies from between 20 and 40 weight percent of the glass matrix (approximately 30 to 50 volume percent).

The preferred calcium fluoride filler may be supplied as either a man-made, synthetic powder or as fluorospar, the naturally occurring mineral version of the compound. The filler may be coated or uncoated, with uncoated being preferred.

The filler is spheroidized by any suitable means such as spray casting or plasma melting. To spray cast, the $CaF_2$ is melted in an inert atmosphere (melting point of $CaF_2$ is 1423° C.). The molten material exits a mold as a stream which is then impinged by one or more jets of a high pressure gas which atomizes the molten stream into a plurality of fine droplets. The atomization chamber is sufficiently sized such that the droplets are substantially solidified prior to impacting a wall or the base of the chamber and solidify as substantially spherical particles. The spherical filler is then collected and sized by passing through a sieve.

Spherical particles may also be formed by plasma spraying. Calcium fluoride particles of random shapes and sizes are passed through a plasma jet in an inert atmosphere. The plasma jet melts the ceramic which due to the surface tension spheroidizes. The spheroids cool and solidify as spherical filler particles which may be collected and sized.

The substantially spherical filler sized to a desired diameter is then mixed with powered sealing glass. The diameter of the filler is preferably that which will pass through a 400 mesh sieve. The preferred diameter of the sealing glass particulate is such that 100% will pass through a 200 mesh sieve and 90% will pass through a 400 mesh sieve. The sealing glass compositions are suitable for sealing electronic packages at a temperature between about 400° C. to about 450° C. In this temperature range, the calcium fluoride additive remains inert but wettable. Limited solubility of the filler is desired because the increase in thermal expansion arises from a physical mixture of glass and filler, not a modification of the basic glass chemistry.

The mixture of glass powder and filler is then heated to a temperature sufficient to allow sufficient glass flow for complete wetting of the particulate. For lead borate glasses, this temperature is about 430° C. for about 10 minutes.

Table 2 presents the calculated effect of the addition of calcium fluoride to the glass matrix defined in Table 1. About 32 weight percent calcium fluoride (48% by volume) is required for a CTE of $170 \times 10^{-7}$ in/in/°C. to match the CTE of copper.

TABLE 2

| Weight percent $CaF_2$ | CTE ($\times 10^{-7}$/°C.) |
|---|---|
| 0 | 110 |
| 5 | 125 |
| 10 | 138 |
| 15 | 148 |
| 20 | 155 |
| 25 | 160 |
| 30 | 168 |
| 32 | 170 |

The large volume of filler required causes problems with glass flow and fracture toughness when randomly shaped particles are employed. These particles are prone to mechanical interlock. With spherical particles, the required filler concentration may be readily achieved. Using the spherical filler, not only can matched sealing to copper be obtained, but also, matched sealing sealing to aluminum.

The advantages of using spherical filler particles will become more apparent from the Example which follows. The Example is intended to be exemplary only and in no way limit the scope of the invention.

EXAMPLE

A ten pound sample of randomly shaped and sized calcium fluoride powder was atomized by plasma torch atomization by Tetronics Research and Development Co., Ltd. (Faringdon, Oxfordshire, England). The recovered powder was segregated by size by passing through sieves. As illustrated in Table 3, the highest yield of spheroidized material was in the −180/+200 range. The powder passed through a 180 mesh screen but not a 200 mesh screen.

TABLE 3

| Size Range | % Recovery | % Spherical |
|---|---|---|
| +180 | 4 | 65 |
| −180/+200 | 17 | 75 |
| −200/+230 | 9 | 50 |
| −230/+270 | 16 | 50 |
| −270/+320 | 0 | 0 |
| −320/+400 | 5 | 25 |
| +400 | 49 | 10 |

Glass composites formed by adding 32% by weight spheroidized −180/+200 CaF$_2$ filler to the glass of Table 1 had improved flow as compared to random shaped and sized CaF$_2$ filler with loading factors as low as 25% by weight. Using a dilatometer, the CTE of the filled glass was determined to be $170 \times 10^{-7}$ in/in/°C. The dilatometer curve was typical of a vitreous solder glass.

Spheroidized barium fluoride provides similar benefits over approximately the same weight and volume percent ranges.

While the invention has been described in terms of substantially spherical particles for increasing the coefficient of thermal expansion of solder glasses, a particulate filler having a coefficient of thermal expansion less than that of the glass matrix is similarly benefited by the process of the invention. Such fillers include alumina, zirconium silicate, silica, zirconia, quartz, beta eucryptite, as well as other fillers known in the art. Similarly, fillers useful in high temperature sealing glasses, such as those glasses used to bond Kovar and other metallic surfaces are also benefited by use of substantially spherical particles. Any filler or combination of fillers may be either coated or uncoated, will benefit from the invention.

The use of spheroidized particles reduces the surface area, improves particle distribution and increases fracture toughness. The essentially spherical particles may all be of essentially the same size, of a variety of sizes, or in a bimodal or other form of distribution.

The dispersion of particles within the glass need not be uniform and the substantially spherical particles may be in any desired gradient or random distribution. The methods of manufacture are not limited to those described hereinabove, any means wherein substantially spherical particles are formed and dispersed throughout a glass matrix without substantial dissolution of the particles is acceptable.

The patents and patent applications set forth in this application are intended to be incorporated in their entirety by reference herein.

It is apparent that there has been provided in accordance with this invention, a sealing glass composite which satisfies the objects, means and advantages set forth hereinabove. While the invention has been described in combination with the embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A sealing glass composite, comprising
   a glass matrix having a sealing temperature below about 450° C. and a coefficient of thermal expansion of from about $80 \times 10^{-7}$ in/in/°C. to about $130 \times 10^{-7}$ in/in/°C.; and
   from 32 to about 85 weight percent based on the total composite of at least one substantially spherical particulate additive dispersed within said glass matrix, said particulate additive selected from the group consisting of calcium fluoride, barium fluoride, coated calcium fluoride, coated barium fluoride and mixtures thereof and having a diameter effective to limit the dissolution of said particulate additive in said glass matrix to less than 10 percent by weight during glass sealing without significantly affecting the flow of said sealing glass composite.

2. The glass composite of claim 1 wherein the diameter of said substantially spherical particulate additive is from about 1 to about 100 microns.

3. The sealing glass composite of claim 2 wherein the diameter of said substantially spherical particulate additive is from about 5 microns to about 40 microns.

4. The sealing glass composite of claim 2 wherein said substantially spherical particulate additive is present in a bimodal size distribution.

5. The sealing glass composite of claim 2 wherein said substantially spherical particulate additive is present in a non-uniform size distribution.

6. The sealing glass composite of claim 2 wherein said substantially spherical particulate additive is uncoated calcium fluoride.

7. The sealing glass composite of claim 1, wherein said glass matrix is selected from the group consisting of lead borate, lead-zinc borate, lead borosilicate and lead-zinc borosilicate.

8. The sealing glass composite of claim 7 wherein said substantially spherical particulate additive has a diameter of from about 1 to about 100 microns.

9. The sealing glass composite of claim 8 wherein said spherical particulate additive has a diameter of from about 5 to about 40 microns.

10. The sealing glass composite of claim 9 wherein said substantially spherical particulate additive is uncoated calcium fluoride.

* * * * *